US006562463B2

(12) United States Patent
Melchiors et al.

(10) Patent No.: US 6,562,463 B2
(45) Date of Patent: May 13, 2003

(54) ONE-COMPONENT STOVING COMPOSITION AND USE THEREOF

(75) Inventors: Martin Melchiors, Leverkusen (DE); Wieland Hovestadt, Leichlingen (DE); Jochen Brück, Overath (DE); Theodor Engbert, Köln (DE); Hans-Josef Buysch, Krefeld (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/169,262

(22) Filed: Oct. 9, 1998

(65) Prior Publication Data
US 2002/0068171 A1 Jun. 6, 2002

(30) Foreign Application Priority Data
Oct. 21, 1997 (DE) .......................... 197 46 379

(51) Int. Cl.⁷ .................. B32B 27/30; B32B 27/36; B32B 27/38; B32B 27/40; C08L 20/00
(52) U.S. Cl. ................ 428/411.1; 428/412; 428/413; 428/423.1; 428/480; 428/521; 428/522; 525/437; 525/440
(58) Field of Search ................ 525/437, 440; 428/480, 423.1, 411.1, 412, 413, 521, 522

(56) References Cited

U.S. PATENT DOCUMENTS

| | | | |
|---|---|---|---|
| 3,730,930 A | 5/1973 | Labana | 524/517 |
| 3,752,870 A | 8/1973 | Labana | 523/437 |
| 3,781,379 A | 12/1973 | Theodore et al. | 525/193 |
| 3,781,380 A | 12/1973 | Labana | 525/208 |
| 3,888,943 A | 6/1975 | Labana | 525/207 |
| 4,091,048 A | 5/1978 | Labana et al. | 525/186 |
| 4,543,376 A | 9/1985 | Schupp et al. | 120/414 |
| 4,772,672 A | 9/1988 | Isozaki et al. | 526/273 |
| 5,002,806 A | * 3/1991 | Chung | 427/385.5 |
| 5,536,582 A | 7/1996 | Prasad et al. | 428/450 |
| 5,621,064 A | 4/1997 | Laas et al. | 528/60 |
| 5,688,891 A | 11/1997 | Hovestadt et al. | 528/73 |
| 5,705,641 A | 1/1998 | Flood et al. | 544/196 |
| 5,750,727 A | 5/1998 | Gras | 548/951 |

FOREIGN PATENT DOCUMENTS

| | | |
|---|---|---|
| CA | 2138636 | 6/1995 |
| CA | 2138637 | 6/1995 |
| DE | 19530225 | 6/1996 |
| DE | 19530226 | 2/1997 |
| EP | 0 600 417 | 6/1994 |
| EP | 0 665 260 | 8/1995 |

\* cited by examiner

*Primary Examiner*—Paul Thibodeau
*Assistant Examiner*—Ramsey Zacharia
(74) *Attorney, Agent, or Firm*—Joseph C. Gil; Thomas W. Roy

(57) ABSTRACT

This invention relates to a new one-component stoving composition, which can be baked at low temperatures without the release of volatile compounds and which also has satisfactory stability when stored at room temperature. The invention also relates to the use of the one-component stoving composition.

9 Claims, No Drawings

ONE-COMPONENT STOVING COMPOSITION AND USE THEREOF

FIELD OF THE INVENTION

The present invention relates to a new one-component stoving composition which can be baked at low temperatures into a coating without the release of volatile compounds and which also has a good storage stability at room temperature.

BACKGROUND OF THE INVENTION

The coating systems used for the protection of substrates against external influences can on the whole be subdivided into two-component systems and one-component systems. For the two-component technique, the two essential starting components—binder and resin—have to be stored separately because of their high reactivity and then mixed together by the technician on site. This requires an exact measurement and often permits only short processing times.

One-component systems do not have this disadvantage. Besides one-component systems which dry by physical means and one-component reactive systems which are cured by atmospheric moisture (curing sensitive to ambient conditions and film thickness) also known are mixtures of at least two reactive components containing at least one of the components in blocked or unreactive form. In these, the blocking agents are eliminated by heating and the reaction between the components then takes place. The terms "baked" and "cured" are synonymous in this application.

Examples of these which may be mentioned are the one-component PU systems based on the very early blocked polyisocyanates described, for example, in DRP 72898. These systems have been widely adopted, above all in the field of industrial baking enamels, for example, for the enamelling of automobiles on production lines and coil coating, and are distinguished by having generally very good film properties, such as resistance to chemicals, scratch resistance and resistance to prolonged weathering. During the baking process, the cross-linking is accompanied by the release of the blocking agent (see, for example, Progr. Coatings 3, (1975), 73 and 9, (1991), 3, which, for reasons explained in more detail below, has to be regarded as a fundamental disadvantage compared with systems where no such release takes place. The same disadvantage is shown by the blocked polyisocyanates recently referred to as carbamates, for example in EP-A 624,577, which can be prepared, for example, from melamine and organic carbonates.

Examples of other baking systems which release decomposition products during the baking process are melamine-formaldehyde resins and urea-formaldehyde resins. The products released here are the alcohols used for etherification and, to a greater or lesser extent, formaldehyde. An additional disadvantage is the lack of resistance to hydrolysis, particularly under acid conditions, which increasingly limits the possible applications of these products.

Recently, there have been intensified endeavours to further improve the acid-resistance of coatings cured by melamine resin. Proposed solutions include additions of binders containing alkoxysilane groups, for example, in U.S. Pat. No. 4,772,672 and EP-A 627,474. Apart from the fact that decomposition products are also formed here, coating systems of this kind have to be specially protected from water, e.g., atmospheric moisture, owing to the resistance to hydrolysis of the alkoxysilyl unit. Furthermore, in view of other important film properties such as flexibility, crack-formation and resistance to the impact of stones, such additives can be used only to a limited extent. Such limited use limits the acid resistance benefits the coatings can provide.

All these systems have the disadvantage that volatile constituents are released in the course of curing, which increases the volatile organic compound (VOC) value. In addition, at greater film thicknesses there is the risk of bubble formation as a result of the substances released. One-component systems which do not release substances do not have these disadvantages. Hitherto only a few cross-linking mechanisms have proved suitable for the preparation of baking enamels which do not release substances.

An important class of products which may be particularly mentioned here are the epoxy resins, which participate in addition reactions, for example, with polyesters or polyacrylates containing carboxylic groups. In particular the aromatic epoxy resins prepared, for example, from bisphenol A have been widely used for powder coatings and tris-glycidyl isocyanurate (TGIC) has found wide application where greater resistance to weathering is required.

One disadvantage of the aromatic epoxy resins is their lack of resistance to light, so that the use of their resulting coating is possible only to a limited extent. There are no such problems with aliphatic TGIC, but doubts regarding its toxicological nature have prompted searches for other alternatives.

TGIC-free aliphatic epoxy-carboxylic acid systems are described inter alia in DE-A 2,240,312, 2,240,314, 2,457,826 or U.S. Pat. No. 4,091,048, both for powder coating applications and for solvent-containing and aqueous liquid coatings. A disadvantage of these systems is their frequently limited storage stability, so that storage for a prolonged period is possible only under cooling conditions. Neither is the standard of their properties adequate for a number of applications, or it is clearly in need of improvement. For application as varnish for automobiles, the relevant properties are lack of resistance to the impact of stones, susceptibility to scratches and yellowing due to heat.

In EP-A 639,598 and 727,452, resins containing uretdione groups are described as another possible route to the preparation of baking systems which do not release substances. These resins can be reacted with compounds containing OH groups with the aid of appropriate catalysis under the conventional conditions for industrial baking enamels. A fundamental disadvantage of such systems is that the resins containing uretdione groups, owing to the chain-extending effect of this internal isocyanate blocking, necessarily have high molecular weights, which limits their possible uses.

Systems which do not release substances and do not have the disadvantages described above can be formulated on the basis of cyclic carbonates. The preparation of compounds containing several carbonate groups in the form of five-membered rings are described, for example, in DE-A 272,665 or 274,721. The opening of the ring (cross-linking) is effected here by means of amino groups. Hydroxyl groups are not reactive enough at the required baking temperatures.

Thus coating materials for electrodip coating which consist of a component containing several carbonate groups in the form of five-membered rings and a component having several primary or secondary amino groups are described, for example, in DE-A 1,953,0,225, DE-A 1,953,0,226, EP-A 661,354 or EP-A 661,355. However, compounds containing several cyclic carbonate groups in the form of six-membered rings are only described in the patents cited above in connection with amines.

DE-A 4,432,647 describes oligourethanes containing 1,3-dioxan-2-one groups, a method for their preparation and their use in combination with compounds having active hydrogen atoms for the production of plastics, or as binders, or binder components in coating materials (one-component baking systems or two-component systems). It emerges from the examples that where polyhydroxy compounds are used as the compounds having active hydrogen atoms, it is possible to formulate one-component systems which are stable in storage at room temperature and can be cured at 155° C. to form hard coating films having good solvent resistance (Example 5).

Baking temperatures of around 155° C. are not a decisive advance in the field of one-component PU baking enamels. Where the compounds having active hydrogen atoms are compounds bearing primary or secondary amino groups, baking temperatures of 80° C. can be achieved (Examples 6, 7). But these systems, owing to the high reactivity of the polyamines, are not stable in storage at room temperature and should therefore be classified as two-component systems. However, DE-A 4,432,647 does not describe a one-component baking system which is based on polyhydroxy compounds as the compounds having active hydrogen atoms), and which has satisfactory storage stability at room temperature and can also be baked at low temperatures with the production of films possessing great hardness and good solvent resistance.

Accordingly, the object of the present invention is to provide a one-component baking system which does not have the above-mentioned disadvantages of the prior art. Particularly, it is an object of the invention to develop a one-component baking system that combines low baking temperatures, good storage stability, provides good coating properties, and which does not release blocking agents during the baking process.

This object can be achieved by the provision of a binder mixture based on a hydroxyfunctional binder and a cross-linking agent containing in the molecule at least two carbonate groups in the form of six-membered rings, in combination with particular catalysts.

SUMMARY OF THE INVENTION

This invention provides a one-component stoving composition containing:

A) a polyhydroxy component comprising one or more compounds having at least 2 hydroxyl groups selected from the group containing hydroxyfunctional polyacrylates, polyesters, polycarbonates, polyethers, polyurethanes, polydiene resins, and epoxy resins; the polyhydroxy component being substantially free from amino groups;

B) a cross-linking component comprising one or more compounds selected from the group having compounds containing at least two cyclic carbonate groups in the form of six-membered rings; the cross-linking component being capable of reacting with the polyhydroxy component; and C) a catalyst component comprising a catalyst selected from the group having metal carboxylates containing at least one metal from groups IA, IB, IIA, IIB, IVA or IVB of the periodic table and at least one carboxylate group compound corresponding to the formula R—COO—, wherein R is a linear or branched, an alkyl group (substituted or unsubstiuted) having 1 to 20 carbon atoms, in which the polyhydroxy component and the crosslinking agent component are present at an equivalent ratio of carbonate groups:OH groups of 0.5:1 to 2.0:1.

This invention also provides the use of the binder mixtures according to the invention, optionally in combination with conventional coating additives, in baking finishes for the enamelling of automobiles on production lines or for the coating of plastics.

DETAILED DESCRIPTION OF THE INVENTION

The polyhydroxy component A) according to the invention is a linear or branched compound having at least 2 hydroxyl groups in the molecule and containing from 0.1 to 20 wt. %, preferably from 0.2 to 10 wt. % and particularly preferably from 0.4 to 6 wt. % of hydroxyl groups. Examples which may be mentioned are the hydroxy-functional polyesters, polycarbonates, polyethers, polyacrylates, polyurethanes, polydiene resins and epoxy resins, or mixtures of these substances, which are known per se in coating technology as coreactants with polyisocyanates. These hydroxy-functional compounds are described, for example, in "Glasurit-Handbuch, Lacke und Farben", 11th Edition, Curt R. Vincentz Verlag, Hanover, 1984, or in D. Stoye, W. Freitag, "Lackharze", Carl Hanser Verlag, Munich, Vienna, 1996. Preferably, however, hydroxyfunctional polyesters, hydroxyfunctional polyacrylates or mixtures of these components are used in the binder mixtures of the present invention.

Suitable compounds for preparing the above-mentioned hydroxy-functional polyesters include in principle all low molecular weight polyhydroxy compounds such as ethylene glycol, 1,2- and 1,3-propanediol, 1,2-, 1,3-, 1,4- and 2,3-butanediol, 1,5-pentanediol, 3-methyl-1,5-pentanediol, 1,6-hexanediol, 1,8-octanediol, 2-methyl-1,3-propanediol, 2,2-dimethyl-1,3-propanediol, 2-ethyl-2-butyl-1,3-propanediol, 2,2,4-trimethyl-1,3-pentanediol, 2-ethyl-1,3-hexanediol, higher molecular weight α,ω-alkanediols having 9 to 18 carbon atoms, cyclohexanedimethanol, cyclohexanediols, glycerol, trimethylolpropane, 1,2,4-butanetriol, 1,2,6-hexanetriol, bis(trimethylolpropane), pentaerythritol, mannitol, sorbitol, methyl glycoside, low molecular weight polyvinyl alcohols and mixtures of these alcohols, in combination with polybasic acids such as adipic acid, azelaic acid, sebacic acid, phthalic acid, isophthalic acid, tetrahydrophthalic acid, hexahydrophthalic acid, maleic acid, the anhydrides of such acids or any mixtures of such acids or acid anhydrides. Polylactones containing hydroxyl groups such as poly-ε-caprolactone, are suitable hydroxyfunctional polyesters for the invention.

The hydroxyfunctional polyacrylates are copolymers of olefinically unsaturated compounds containing hydroxyl groups, having an average molecular weight $M_n$ of from 500 to 100,000 and preferably from 2,000 to 30,000. Average molecular weight values in this application is based on number unless otherwise indicated. Non-hydroxyfunctional monomers suitable for the preparation of these polyacrylates are, for example, acrylic acid or methacrylic alkyl esters or methacrylic cycloalkyl esters having 1 to 18, preferably 1 to 8 carbon atoms with an alkyl group or cycloalkyl group such as methyl, ethyl, n-propyl, n-butyl, isopropyl, isobutyl, t-butyl esters, the isomeric pentyl, hexyl, octyl, dodecyl, hexadecyl or octadecyl esters of the above-mentioned acids, acetoacetoxyethyl methacrylate, acrylonitrile, vinyl ether, methacrylonitrile, vinyl acetate, styrene or vinyl toluene. Also suitable are unsaturated monomers containing carboxyl groups such as acrylic acid, methacrylic acid, itaconic acid, crotonic acid and half-esters of maleic acid and fumaric acid as well as mixtures thereof or any mixtures of monomers of this kind, and other monomers.

Examples of suitable alcoholic monomers containing hydroxyl groups are the hydroxyalkyl esters of (,β-unsaturated carboxylic acids, in particular of acrylic acid or methacrylic acid, having 2 to 12 and preferably 2 to 6 carbon atoms in the hydroxyalkyl group, such as 2-hydroxyethyl acrylate, the isomeric hydroxypropyl acrylates obtainable by addition of 1 mol propylene oxide to 1 mol acrylic acid, 2-, 3-and 4-hydroxybutyl acrylate, the isomeric hydroxyhexyl acrylates and the methacrylates corresponding to these acrylates. Equally suitable are hydroxyfunctional monomers modified, or with their chains lengthened, by ethylene oxide, propylene oxide and/or butylene oxide, and having a maximal molecular weight of 376 g/mol.

Compounds which contain one or more primary or secondary amino groups in the molecule (such as low molecular weight polyamines or aminofunctional epoxy resins) are not suitable as component A) for the present invention. Amino groups, like the hydroxyl groups according to the invention, likewise have the capacity to react with the cyclic carbonate group of the cross-linking component B), but the reactivity of the aminofunctional components towards carbonates in the form of six-membered rings is so high that the resulting binder mixtures formulated are not sufficiently stable in storage.

The cross-linking component B) is a compound containing in the molecule at least two carbonate groups in the form of six-membered rings, in particular the oligourethanes described in DE 4,432,647 which contain 1,3-dioxan-2-one groups and are prepared by the reaction of hydroxy-functional carbonates in the form of six-membered rings with polyisocyanate compounds having an average NCO functionality of at least two. The isocyanate-functional compounds are selected from the group containing (i) coating polyisocyanates, e.g., biuret polyisocyanates, polyisocyanates containing isocyanurate groups (and optionally uretdione groups), polyisocyanates containing urethane and/or allophanate groups or polyisocyanates containing isocyanurate and allophanate groups, or mixtures of these polyisocyanate components, (ii) unmodified organic polyisocyanates having molecular weights in the range of from 140 to 300 g/mol or (iii) mixtures of the above-mentioned polyisocyanates.

For the purpose of the present invention, the preferred oligourethanes are those synthesized from 1,3-dioxan-5-hydroxymethyl-5-ethyl-2-one as a hydroxy component and polyisocyanates containing isocyanurate groups or isocyanurate and allophanate groups and based on hexamethylene diamine (HDI) or isophorone diamine (IPDI), optionally mixed with HDI and/or IPDI, wherein the proportion of NCO groups in the monomeric diisocyanates must not amount to more than 50% of the total NCO content of the isocyanate component.

Particularly preferred oligourethanes are those synthesized from 1,3-dioxan-5-hydroxymethyl-5-ethyl-2-one as hydroxy component and from trimers of HDI or of IPDI containing isocyanurate groups, or mixtures of these coating polyisocyanates.

Suitable cross-linking components B) for the purpose of the present invention are, however, the polymers (polyvinyl compounds, polyacrylates) described in EP 665 260, which contain cyclic carbonate groups in the form of six-membered rings as lateral groups.

According to the invention, the binder mixture contains, in addition, a component C) as a catalyst for the cross-linking reaction between components A) and B). In this connection, the catalyst may be:

C1) organometallic compounds which contain at least one metal from group IVA or group IVB, preferably tin, titanium or zirconium, at least one, optionally substituted, alkyl or aryl group bonded to a metal, at least one carboxylic group and optionally other groups bonded to a metal, for example, halogen, hydroxyl, alcoholate, phenolate, thioalcoholate or mercapto groups. But the compounds preferably used are dialkyltin dicarboxylates such as dibenzyltin diacetate, dibenzyltin distearate, dibutyltin diacetate, dibutyltin dilaurate, dibutyltin maleate, dilauryltin diacetate, dioctyltin diacetate, dioctyltin dilaurate, diphenyltin diacetate or other alkyltin carboxylates, such as dibutyl-methoxytin acetate, methyltin trilaurate, butyltin trilaurate, butyltin triacetate, butyltin tris(2-ethoxyhexanoate) or combinations of these compounds; the use of dibutyltin diacetate is particularly preferred.

Besides these compounds, the following may also be used as the catalyst component:

C2) weakly basic metal carboxylates, preferably the sodium, potassium, magnesium, calcium or zinc salts of relatively long-chain carboxylic acids having 6 or more carbon atoms, for example, capric acid, lauric acid, myristic acid, palmitic acid, stearic acid or (-branched carboxylic acid such as a Versatic® acid. Cycloaliphatic carboxylic acids can also be used. The use of sodium laurate is particularly preferred.

Catalysts generally known from prior art which catalyze a nucleophilic attack on a carbonyl group and in particular on a carbonate group are, however, unsuitable for use as component C) in the coating materials according to the invention; examples are tertiary amines, tetraalkylammonium hydroxides, basic metal hydroxides, alcoholates or phenolates. These catalysts lead to the production of baking systems which are not stable in storage at room temperature. Equally unsuitable are the known acid catalysts, such as p-toluenesulfonic acid or trifluoromethanesulfonic acid, which are described, for example, in DE-A 665,260 for the ring-opening of cyclic carbonates using hydroxyl groups. Here the catalytic activity is insufficient for the attainment of low baking temperatures.

The catalyst component contains at least one carboxylate group compound corresponding to the formula R—COO—, wherein R is a linear or branched, an optionally substituted alkyl group having 1 to 20 carbon atoms. The term "optionally substituted" means the alkyl group can be unsubstituted or substituted.

Component C) is used in concentrations of from 0.01 to 2% and in particular from 0.1 to 1%, based on the combined weight of components A) and B), in order to achieve balanced conditions of low baking temperature and good storage stability at room temperature.

The one-component stoving composition according to the invention, when stored at room temperature, has a storage stability of >2 weeks, in particular of >4 weeks. Storage stability herein means the time from when components A), B) and C) are mixed together to when the maximum acceptable viscosity for processing (in the field of use according to the invention) is passed.

The one-component stoving composition according to the invention can be baked at temperatures of between 70° C. and 150° C. and in particular between 90° C. and 130° C.

Baking (30 to 60 min.) at these temperatures results in hard films having good solvent resistance, surface condition and mechanical properties. The composition can cure without the release of substances. It has in addition a good storage stability (processing time of at least 4 weeks) at room temperature.

This result is surprising, because the binder mixtures composed of oligourethanes containing 1,3-dioxan-2-one groups and polyhydroxy compounds as the compounds having active hydrogen atoms, but without the use of component C) according to the invention, require excessively high baking temperatures. Binder mixtures which contain known catalysts which catalyze a nucleophilic attack on a carbonyl group and in particular on a carbonate group, e.g., alkaline earth metal hydroxides, alcoholates or phenolates, tin alcoholate or titanium alcoholate, tertiary amines or p-toluenesulfonic acid) do not in general have adequate storage stability at room temperature, or require excessively high baking temperatures.

The one-component stoving composition according to the invention can be used as a constituent of one-component baking enamels, in particular in the areas involving the enamelling of automobiles on production lines or the coating of plastics. The industrial coating of metal and wood substrates is also a suitable area of use for one-component baking enamels, which include the binders according to the invention.

For the use according to the invention, the coating material may, of course, contain the auxiliary substances and additives conventionally used in the formulation of coatings. These include, for example, flow-control agents, additives for controlling the viscosity, pigments, fillers, dulling agents, UV stabilizers and antioxidants.

The invention is further illustrated but is not intended to be limited by the following examples in which all parts and percentages are by weight unless otherwise specified.

EXAMPLES

Viscosity measurements were carried out in a rotational viscosimeter in accordance with DIN 53 019 at a shear rate of $10\ s^{-1}$.

Example 1

Preparation of an Oligourethane According to the Invention 160 g (1.0 mol) 5-ethyl-5-hydroxymethyl-1,3-dioxan-2-one (TMPC) and 100 g methoxypropyl acetate (MPA) were placed in a 1 liter three-necked flask equipped with stirrer, dropping funnel and thermometer and heated to 70° C. When these substances were completely dissolved, 195 g (=1 mol NCO groups) of a coating polyisocyanate containing isocyanurate groups and based on HDI, having an NCO content of 21.8% (Desmodur® N 3300, product of Bayer AG), dissolved in 52.1 g MPA was added thereto over a period of 1 hour. After 16 hours at 70° C., the reaction was terminated and a solution of the oligourethane according to the invention was obtained. This solution had a viscosity of 21,000 mPa·s.

Example 2

Preparation of an Oligourethane According to the Invention 160 g (1.0 mol) TMPC and 107 g MPA were placed in a 1 liter three-necked flask equipped with stirrer, dropping funnel and thermometer and heated to 50° C. At this temperature, 0.36 g (0.1 wt. %) dimethyl phosphite and 0.73 g (0.2 wt. %) dibutyltin dilaurate were added thereto and the mixture was stirred until a homogeneous solution was obtained. This was cooled to 30° C. and then, in succession, 163.8 g of a coating polyisocyanate containing isocyanurate groups and based on IPDI (as 70% solution in MPA/xylene), having an NCO content of 11.5% "based on solution" (Desmodur® Z 4470, product of Bayer AG), and 88.7 g of a coating polyisocyanate containing isocyanurate groups and based on HDI, having an NCO content of 21.8% (Desmodur® N 3300, product of Bayer AG), dissolved in 86.4 ml MPA were added thereto over a period of 1 hour. In the course of this, the temperature did not rise above 35° C. After a further 6 hours at 30° C., the reaction was terminated and a solution of the oligourethane according to the invention was obtained. This solution had a viscosity of 6,700 mpa·s.

Example 3

Preparation and Processing of a One-component Baking System According to the Invention 67.7 g Desmophen® 650, a hydroxyfunctional polyester polyol from Bayer AG, 65% in MPA, having an OH content of 5.2% "based on solution", and 0.84 g (0.5 wt. %) sodium laurate were added to 100 g of the product from Example 1. The mixture was stable in storage at room temperature and was satisfactorily processed after having been stored for 4 weeks at room temperature. It was applied to a test plate and baked at 120° C. for 30 minutes. A hard, solvent-resistant coating film was obtained.

Example 4

Preparation and Processing of a One-component Baking System According to the Invention 67.7 g Desmophen® 650, a hydroxyfunctional polyester polyol from Bayer AG, 65% in MPA, having an OH content of 5.2% "based on solution", and 0.84 g (0.5 wt. %) dibutyltin diacetate were added to 100 g of the product from Example 1. The mixture was stable in storage at room temperature and was satisfactorily processed after having been stored for 4 weeks at room temperature. It was applied to a test plate and baked at 120° C. for 30 minutes. A hard, solvent-resistant coating film was obtained.

Example 5

Preparation and Processing of a Baking System (Not According to the Invention)

67.7 g Desmophen® 650, a hydroxyfunctional polyester polyol from Bayer AG, 65% in MPA, having an OH content of 5.2% "based on solution", and 0.33 g (0.2 wt. %) potassium hydroxide were added to 100 g of the product from Example 1. After having been stored for 3 days at room temperature, the mixture is gel-like. A portion of the freshly prepared mixture was applied to a test plate and baked at 120° C. for 30 minutes. A hard, solvent-resistant coating film was obtained.

Example 6

Preparation and Processing of a One-component Baking System According to the Invention 58.8 g Desmophen® VP LS 2009/1, a hydroxyfunctional polyacrylate from Bayer AG, 70% in butyl acetate, having an OH content of 3.0% "based on solution", 24.4 g Desmophen® VP LS 2971, a hydroxyfunctional polyester polyol from Bayer AG, 80% in butyl acetate, having an OH content of 3.8% "based on solution", and 1.2 g (1 wt. %) sodium laurate were added to 100 g of the product from Example 2. The mixture was stable in storage at room temperature and was satisfactorily processed after having been stored for 4 weeks at room temperature. It was applied to a test plate and baked at 140° C. for 60 minutes. A hard, solvent-resistant coating film was obtained.

Although the invention has been described in detail in the foregoing for the purpose of illustration, it is to be understood that such detail is solely for that purpose and that variations can be made therein by those skilled in the art without departing from the spirit and scope of the invention.

What is claimed is:

1. A one-component stoving composition, which has a storage stability of greater than 2 weeks at room temperature and comprises
    A) a polyhydroxy component comprising one or more compounds having at least 2 hydroxyl groups selected from the group consisting of polyacrylates, polyesters, polycarbonates, polyethers, polyurethanes, polydiene resins, and epoxy resins; the polyhydroxy component being free from amino groups;
    B) a cross-linking component comprising one or more compounds selected from the group consisting of compounds containing at least two cyclic carbonate groups in the form of six-membered rings which are the urethane group-containing reaction products of a hydroxy-functional compound containing a cyclic carbonate group in the form of a six-membered ring with a polyisocyanate compound having an average NCO functionality of at least two: the cross-linking component being capable of reacting with the polyhydroxy component: and
    C) a catalyst component comprising dibutyltin diacetate or sodium laurate; wherein the polyhydroxy component and the crosslinking agent component are present at an equivalent ratio of carbonate groups:OH groups of 0.5:1 to 2.0:1.

2. The composition according to claim 1, wherein the polyhydroxy component comprises a component selected from the group consisting of hydroxyfunctional polyacrylates and hydroxyfunctional polyesters.

3. The composition according to claim 1, wherein the cross-linking agent comprises an oligourethane prepared by the reaction of 1,3-dioxan-5-hydroxy-methyl-5-ethyl-2-one with an isocyanate-functional compound comprising a member selected from the group consisting of polyisocyanates containing biuret groups polyisocyanates containing isocyanurate groups, polyisocyanates containing uretdione groups, polyisocyanates containing urethane groups, polyisocyanates containing allophanate groups, and unmodified organic polyisocyanates having molecular weights of 140 to 300 g/mol.

4. The composition according to claim 1, wherein the cross-linking agent comprises an oligourethane synthesized from 1,3-dioxan-5-hydroxymethyl-5-ethyl-2-one and a polyisocyanate component prepared from hexamethylene diisocyanate and containing isocyanurate groups, and a polyisocyanate component prepared from isophorone diisocyanate and containing isocyanurate groups.

5. The composition according to claim 1, wherein the catalyst component comprises a component selected from the group consisting of:
    C1) organometallic compounds which contain (i) at least one metal, selected from the group consisting of tin, titanium and zirconium, (ii) at least one linear or branched, optionally substituted alkyl or aryl group bonded to a metal and (iii) at least one carboxylic group corresponding to the formula R—COO—, wherein R is a linear or branched, optionally substituted alkyl group having 1 to 20 carbon atoms, and (iv) optionally other groups bonded to a metal selected from the group consisting of halogen, hydroxyl, alcoholate, phenolate, thioalcoholate or mercapto groups, and
    C2) weakly basic metal carboxylates, having at least one metal, and selected from the group consisting of sodium, potassium, magnesium, calcium or zinc and at least one aliphatic carboxylic group corresponding to the formula R—COO—, wherein R is a linear or branched, optionally substituted alkyl group having 9 to 20 carbon atoms.

6. The composition of claim 1, wherein the catalyst component is present at an concentration of from 0.01 to 2%, based on the combined weight of the components A) and B).

7. The composition of claim 1, wherein the composition has a storage stability that is greater than 4 weeks at room temperature.

8. A one-component stoving composition, which has a storage stability of greater than 2 weeks at room temperature, is capable of being baked into a coating baked at a temperature ranging from about 90° C. and 130° C. and comprises
    A) a polyhydroxy component comprising one or more compounds having at least 2 hydroxyl groups selected from the group consisting of polyacrylates, polyesters, polycarbonates, polyethers, polyurethanes, polydiene resins, and epoxy resins; the polyhydroxy component being free from amino groups;
    B) a cross-linking component comprising one or more compounds selected from the group consisting of compounds containing at least two cyclic carbonate groups in the form of six-membered rings, which are the urethane group-containing reaction products of a hydroxy-functional compound containing a cyclic carbonate group in the form of a six-membered ring with a polyisocyanate compound having an average NCO functionality of at least two; the cross-linking component being capable of reading with the polyhydroxy component: and
    C) a catalyst component comprising dibutyltin diacetate or sodium laurate, wherein the polyhydroxy component and the crosslinking agent component are present at an equivalent ratio of carbonate groups:OH groups of 0.5:1 to 2.0:1.

9. A substrate covered with the composition of claim 8.

* * * * *